(12) United States Patent
Hamana

(10) Patent No.: US 10,592,085 B2
(45) Date of Patent: Mar. 17, 2020

(54) INFORMATION PROCESSING APPARATUS, CONTROL METHOD THEREOF AND RECORDING MEDIUM

(71) Applicant: CANON KABUSHIKI KAISHA, Tokyo (JP)

(72) Inventor: Akihiro Hamana, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 15/681,543

(22) Filed: Aug. 21, 2017

(65) Prior Publication Data

US 2018/0059922 A1  Mar. 1, 2018

(30) Foreign Application Priority Data

Aug. 29, 2016 (JP) ................. 2016-167143

(51) Int. Cl.
*G06F 3/0481* (2013.01)
*G06F 3/0484* (2013.01)
*G06F 3/0485* (2013.01)
*G06F 3/0483* (2013.01)
*G06F 3/0482* (2013.01)
*G06F 3/0488* (2013.01)

(52) U.S. Cl.
CPC ........ *G06F 3/04847* (2013.01); *G06F 3/0482* (2013.01); *G06F 3/0483* (2013.01); *G06F 3/0485* (2013.01); *G06F 3/04855* (2013.01); *G06F 3/04886* (2013.01)

(58) Field of Classification Search
CPC ....... G06F 3/04883; G06F 2203/04807; G06F 3/0481; G06F 3/0482; G06F 3/0483; G06F 17/30274; G06F 3/04855; G06F 3/0488

USPC .......................................... 715/833
See application file for complete search history.

(56) References Cited

U.S. PATENT DOCUMENTS

| 4,920,432 A * | 4/1990 | Eggers ............... G11B 15/6835 |
| | | 348/E7.071 |
| 6,331,877 B1 * | 12/2001 | Bennington ....... H04N 5/44543 |
| | | 348/564 |
| 9,094,534 B2 * | 7/2015 | Seymour ............... H04M 19/04 |
| 9,510,036 B1 * | 11/2016 | Lewis ............. H04N 21/26258 |

(Continued)

FOREIGN PATENT DOCUMENTS

| JP | 10-143505 A | 5/1998 |
| JP | 2010-231810 A | 10/2010 |

(Continued)

OTHER PUBLICATIONS

Jul. 3, 2018 Japanese Office Action, which is without enclosed an English Translation, that issued in Japanese Patent Application No. 2016167143.

*Primary Examiner* — Arpan P. Savla
*Assistant Examiner* — Erik V Stitt
(74) *Attorney, Agent, or Firm* — Cowan, Liebowitz & Latman, P.C.

(57) ABSTRACT

An information processing apparatus according to an embodiment determines whether an object which is a target of processing corresponding to user operation is displayed in a display area. If the object of the target is displayed in the display area, the apparatus executes the processing on the object in accordance with the user operation, but if the object of the target is not displayed in the display area, the apparatus suspends execution of the processing.

11 Claims, 7 Drawing Sheets

(56) References Cited

U.S. PATENT DOCUMENTS

| | | | |
|---|---|---|---|
| 9,552,439 B1* | 1/2017 | Krecichwost | G06Q 30/0277 |
| 9,733,809 B1* | 8/2017 | Greene | G06F 3/0482 |
| 2006/0156240 A1* | 7/2006 | Lemay | G06Q 10/107 |
| | | | 715/730 |
| 2013/0219320 A1* | 8/2013 | Seet | G06F 3/0483 |
| | | | 715/776 |
| 2014/0195909 A1* | 7/2014 | Rothkopf | G11B 27/105 |
| | | | 715/716 |
| 2014/0223377 A1* | 8/2014 | Shaw | G06F 3/0482 |
| | | | 715/835 |
| 2015/0135049 A1* | 5/2015 | Murphy | G06F 17/2235 |
| | | | 715/205 |
| 2015/0220264 A1* | 8/2015 | Lewis | H04N 21/26258 |
| | | | 715/716 |
| 2016/0132204 A1* | 5/2016 | Maruyama | G06F 3/0488 |
| | | | 715/784 |
| 2017/0199659 A1* | 7/2017 | Migos | G06F 3/04847 |

FOREIGN PATENT DOCUMENTS

| | | |
|---|---|---|
| JP | 2013-211031 A | 10/2013 |
| JP | 2014-106625 A | 6/2014 |

\* cited by examiner

INFORMATION PROCESSING APPARATUS, CONTROL METHOD THEREOF AND RECORDING MEDIUM

BACKGROUND OF THE INVENTION

Field of the Invention

The present invention relates to an information processing apparatus, a control method thereof and a recording medium, in particular, to an information processing apparatus that performs scroll display, a control method thereof, and a recording medium.

Description of the Related Art

There is known scroll display in which contents to be displayed are slid and switched when a large amount of contents that do not fit within the display area are displayed. Japanese Patent Application Laid-Open No. 2010-231810 discloses an application window having a scroll bar that provides a scroll function. Japanese Patent Application Laid-Open No. 2013-211031 discloses a touch screen display that performs scroll display in accordance with flick operation, swipe operation, and the like.

When editing work is performed using the application window of Japanese Patent Application Laid-Open No. 2010-231810, processing is executed on a target located at the cursor position. In the case of performing the editing work using the touch screen display of Japanese Patent Application Laid-Open No. 2013-211031, the processing is executed on the target selected in advance by tap operation or the like. However, in these editing operations, processing can be executed even in a state where the target is no longer displayed after the target of processing is moved outside the display area by scroll display or the like. When the processing is executed in a state where the user cannot see the target, it is difficult to grasp immediately the target and contents of the processing and the processing may be executed on the target not intended by the user, which causes inconvenience.

SUMMARY OF THE INVENTION

An information processing apparatus according to an embodiment of the present invention includes a display control unit which controls a display device so as to display a part of a plurality of objects in a display area, a determination unit which determines whether an object which is a target of processing corresponding to user operation is displayed in the display area, a processing control unit which executes the processing on the target in accordance with the user operation if the target is displayed in the display area, and suspends execution of the processing on the target if the target is not displayed in the display area.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
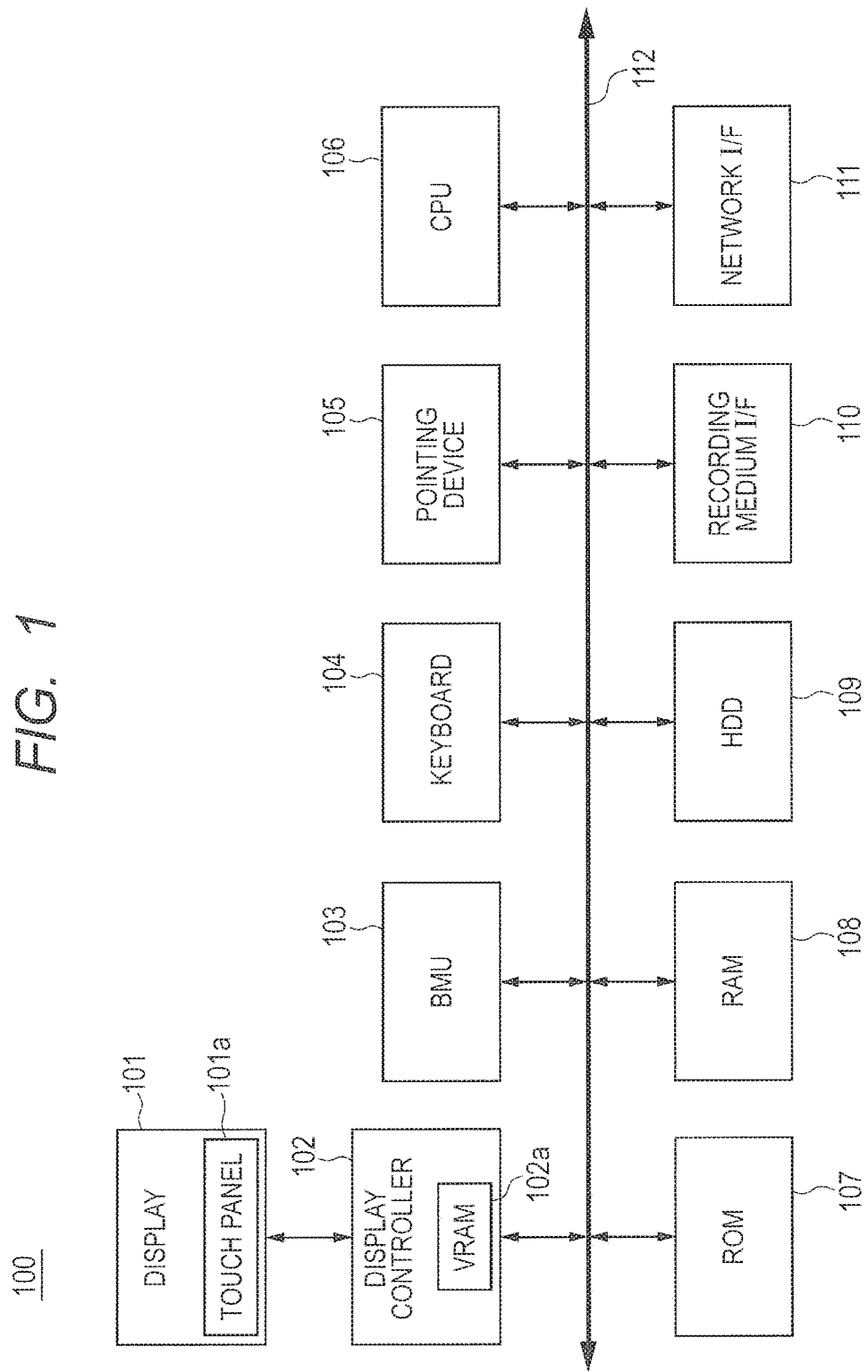
FIG. 1 is a block diagram of an information processing apparatus according to a first embodiment.

FIG. 1 is a block diagram of an information processing apparatus according to the present embodiment. The information processing apparatus 100 includes a display 101, a display controller 102, a bit move unit (BMU) 103, a keyboard 104, a pointing device 105, and a central processing unit (CPU) 106. The information processing apparatus 100 further includes a read only memory (ROM) 107, a random access memory (RAM) 108, a hard disk drive (HDD) 109, a recording medium interface (I/F) 110, a network I/F 111, and a bus 112.

The display 101 is, for example, a liquid crystal device, an organic light emitting display, or the like, and performs display in accordance with display data from the display controller 102. The display 101 displays, for example, icons, messages, menus, other graphical user interfaces (GUI), and contents such as text, images, figures.

The display 101 is provided with a transmissive touch panel 101a. The user can perform, for example, tap operation, swipe operation, or the like on the GUI displayed on the touch panel 101a. The tap operation is operation of tapping the touch panel 101a lightly with a fingertip. For example, a button type icon can be pressed by tap operation. The swipe operation is operation of moving (sliding) a fingertip in one direction while being in contact with the touch panel 101a. By swipe operation, it is possible to change a page displayed on the display 101, that is, possible to go to the next page or return to the previous page at the time of browsing text, images, or the like.

The display controller 102 includes a video RAM (VRAM) 102*a* and controls display on the display 101. The display controller 102 generates display data to be displayed on the display 101 and temporarily stores the data in the VRAM 102*a*. The display controller 102 transfers the generated display data to the display 101 in accordance with a prescribed rule. As a result, the display data is displayed on the display 101. In addition, the display controller 102 includes a coordinate detection circuit for detecting the contact position of a finger with respect to the touch panel 101*a*. The coordinate detection circuit can detect touch operation such as tap operation, swipe operation, and flick operation.

The BMU 103 controls data transfer between memories, and data transfer between the memory and each input/output device. For example, the BMU 103 controls data transfer between the VRAM 102*a* and the RAM 108, data transfer between the RAM 108 and the network I/F 111, and the like.

The keyboard 104 has various keys for inputting characters, deleting characters, moving a cursor, scrolling a screen, and the like. When the key of the keyboard 104 is operated by the user, the processing assigned to each key is executed on the target. For example, at the time of editing a document, the processing target is a character in a document, a paragraph of a document, an entire document, or the like. In addition, when a photo book is edited, the processing target is contents such as text, images, figures, etc. in the photo book, each page of the photo book, the entire photo book, or the like.

The pointing device 105 is a pointing device such as a mouse having buttons and a wheel, and is used, for example, to designate GUIs such as icons and menus displayed on the display 101, and other contents. For example, scroll display can be performed by dragging the scroll bar with the mouse or by rotating the wheel of the mouse.

The CPU 106 totally controls the information processing apparatus 100. By reading out a predetermined program from the ROM 107 or the HDD 109 and executing the program, the CPU 106 achieves functions as a determination unit and a control unit of the information processing apparatus 100.

The ROM 107 is composed of a nonvolatile memory, and stores a basic input output system (BIOS), various setting files, and the like. The RAM 108 includes a volatile memory and is used as a work area of the CPU 106, a data saving area at the time of error handling, and a program load area.

The HDD 109 stores basic programs such as an operating system (OS) executed by the CPU 106, and application programs for editing documents, photo books, and the like. The HDD 109 further stores contents such as texts, images, figures to be used in the application program, and documents, photo books, and the like created by the application program.

The recording medium I/F 110 transmits and receives data between the information processing apparatus 100 and an external recording medium. The recording medium is a portable nonvolatile memory, and is detachably connected to the recording medium I/F 110.

A network interface (I/F) 111 communicates with external apparatuses such as other information processing apparatuses, printers, storages, etc. via a network. The network is a communication network such as a local area network (LAN), the Internet, or the like.

The bus 112 includes an address bus, a data bus, and a control bus. The display controller 102, BMU 103, keyboard 104, pointing device 105, CPU 106, ROM 107, RAM 108, HDD 109, recording medium I/F 110, and network I/F 111 are connected to the bus 112.

The program can be also provided to the CPU 106 from the recording medium via the ROM 107, HDD 109, and recording medium I/F 110. Further, the program can be also provided to the CPU 106 from an external apparatus such as another information processing apparatus and a storage through a network via the network I/F 111.

FIGS. 2A to 2D show an example of a text editing screen of the information processing apparatus according to the present embodiment. A text editing screen 200 is a GUI displayed on the display 101, and is used for editing a text 203. When the entire text 203 does not fit within the text editing screen 200, only a part of the text 203 is displayed on the text editing screen 200 and the rest of the text 203 is not displayed. The user can change the display range of the text 203, for example, by operating the scroll key of the keyboard 104, the wheel of the pointing device 105, or the like.

A cursor 201 indicates a target on which processing such as input and deletion of characters is performed. A scroll bar 202 shows the position and ratio of the display range of the text 203 with respect to the entire text 203. The user can change the display range of the text 203 by dragging the scroll bar 202 using the pointing device 105, for example.

Figure 2A:
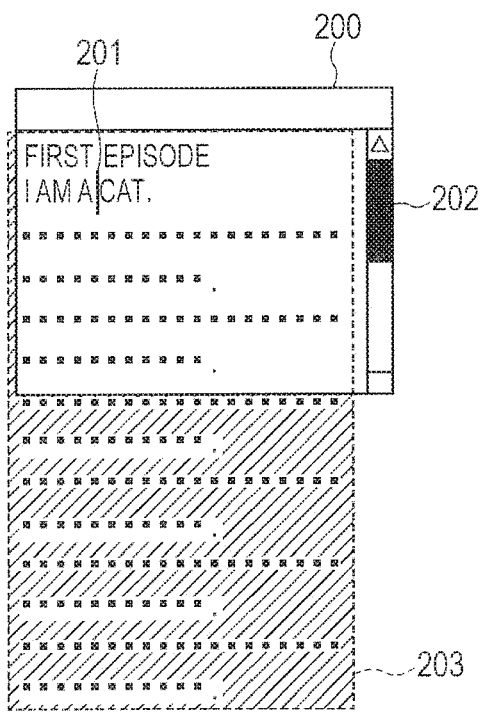
FIG. 2A is an example of a text editing screen of the information processing apparatus according to the first embodiment.
Figure 2B:
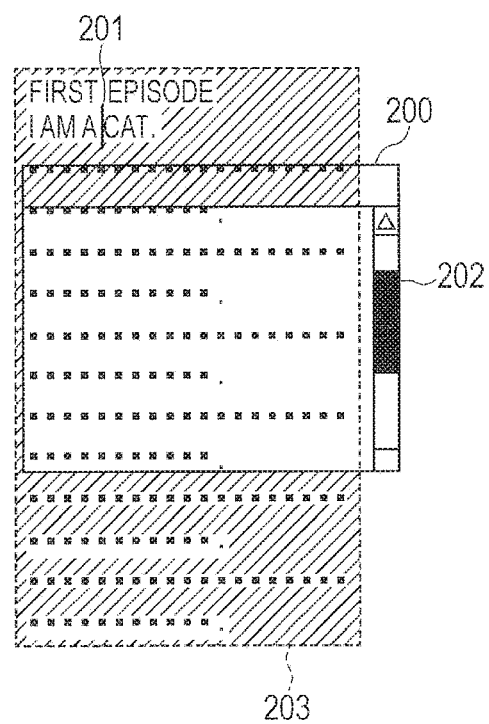
FIG. 2B is an example of the text editing screen of the information processing apparatus according to the first embodiment.
Figure 2C:
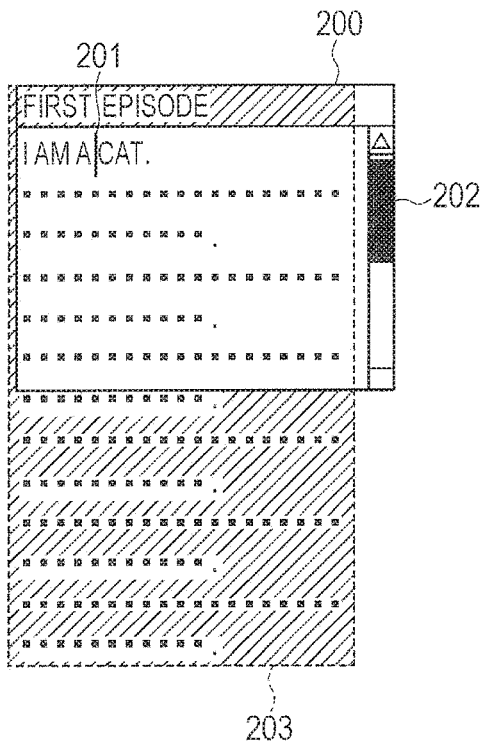
FIG. 2C is an example of the text editing screen of the information processing apparatus according to the first embodiment.
Figure 2D:
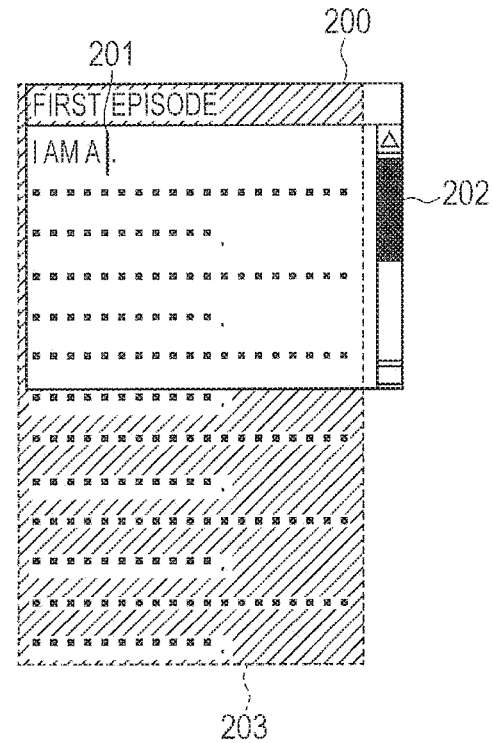
FIG. 2D is an example of the text editing screen of the information processing apparatus according to the first embodiment.

FIG. 2A shows a state where the head portion of the text 203 is displayed on the text editing screen 200. FIG. 2B shows a state where upward scroll display has been performed in the state shown in FIG. 2A. FIG. 2C shows a state where the operation of the DELETE key has been performed in the state shown in FIG. 2B. FIG. 2D shows a state after the deletion of processing corresponding to the operation of the DELETE key has been performed in the state shown in FIG. 2C.

In FIGS. 2A and 2B, the cursor 201 is at the same position (the second line) of the text 203. However, since the display range of the text 203 is different, the position of the thumb of the scroll bar 202 is different. In FIG. 2B, the cursor 201 is not displayed because the cursor 201 is out of the text editing screen 200, that is, outside the display area. For the sake of convenience of illustration, a portion where the text 203 is not displayed is indicated by oblique lines.

In FIG. 2C, when the operation of the DELETE key is performed, since the cursor 201 is outside the display area (FIG. 2B), the deletion processing corresponding to the DELETE key has not been executed. That is, the character string "cat" which is the processing target indicated by the cursor 201 has not been deleted. In FIG. 2C, in place of the deletion processing, processing of scrolling the text 203 downward so as to display the character string "cat" which is the processing target has been executed.

FIGS. 3A to 3D show an example of a page editing screen of the information processing apparatus according to the present embodiment. A page editing screen 300 is a GUI displayed on the display 101, and is used for editing each page of a photo book. When all the pages of the photo book cannot fit in the page editing screen 300 and all of them cannot be displayed at once, display control is performed such that only some of the pages are displayed in the page editing screen 300 and other pages of the photo book are not displayed. The user performs a scrolling display by swiping in the right and left direction on the page editing screen 300 or by tapping an arrow icon 302, and performs display control so as to change the page object displayed on the page editing screen 300.

In FIGS. 3A to 3D, a hatched page object 301*a* is a currently selected page object, and is a target of processing assigned to icons 303a to 303e. The icon 303a is used to change the layout of the page, and the icon 303b is used to change the image to be placed on the page. The icon 303c is used to enter text on the page and the icon 303d is used to save the page. The icon 303e is used to display a submenu associated with the page. Other various icons may be displayed on the page editing screen 300.

Figure 3A:
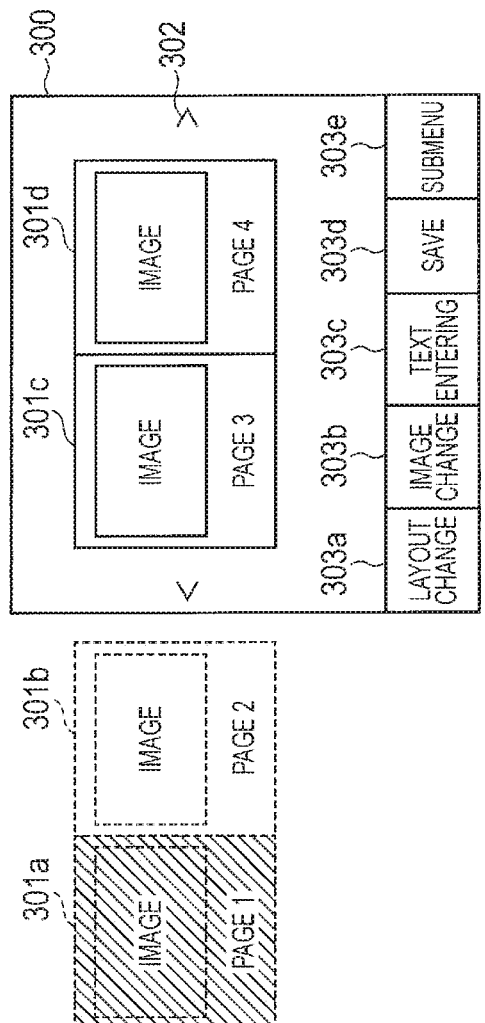
FIG. 3A is an example of a page editing screen of the information processing apparatus according to the first embodiment.

FIG. 3A shows a state where page objects 301a and 301b of the photo book are displayed on the page editing screen 300. The page objects 301a and 301b are icons indicating pages 1 and 2 of the photo book, respectively. In FIG. 3A, the user performs tap operation on the page object 301a and selects the page object 301a as a processing target.

Figure 3B:
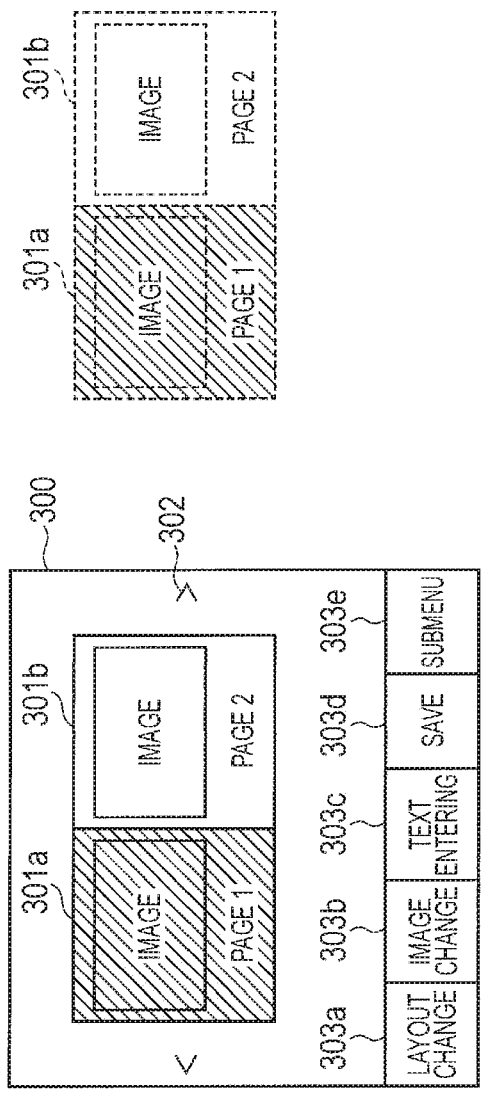
FIG. 3B is an example of the page editing screen of the information processing apparatus according to the first embodiment.

FIG. 3B shows a state where the user has performed swipe operation to scroll the displayed page object in the state shown in FIG. 3A. In FIG. 3B, page objects 301c and 301d different from the selected page object 301a are displayed. In FIG. 3B, the selected page object 301a is not displayed because the selected page object 301a is outside the page editing screen 300, that is, outside the display area. For convenience of illustration, the page objects 301a and 301b which are not displayed are represented by broken lines.

Figure 3C:
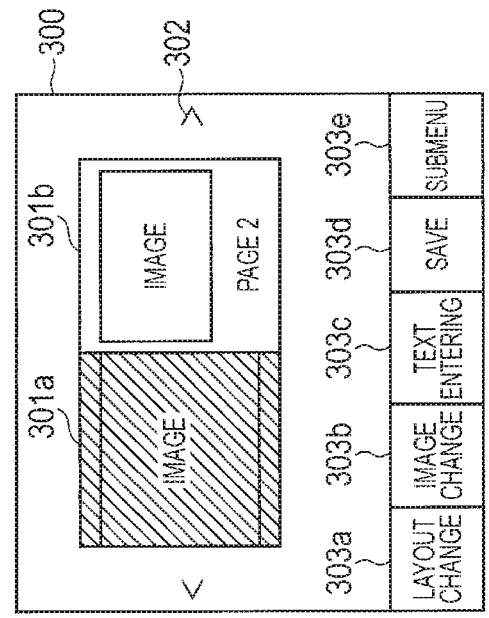
FIG. 3C is an example of the page editing screen of the information processing apparatus according to the first embodiment.
Figure 3D:
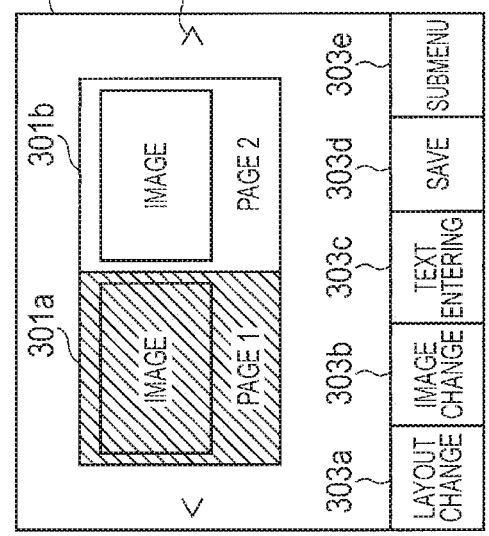
FIG. 3D is an example of the page editing screen of the information processing apparatus according to the first embodiment.

FIG. 3C shows a state where the tap operation of the icon 303a has been performed in the state shown in FIG. 3B. In FIG. 3C, since the page object 301a which is the processing target was outside the display area (FIG. 3B) when the tap operation was performed, the layout change processing corresponding to the tap operation has not been executed. That is, the layout of page 1 indicated by the page object 301a has not been changed. In FIG. 3C, in place of the layout change processing, processing of scrolling the page objects 301a to 301d to the right so as to display the page object 301a has been executed. FIG. 3D shows a state after the layout change processing corresponding to the tap operation of the icon 303a is executed in the state shown in FIG. 3C.

Figure 4:
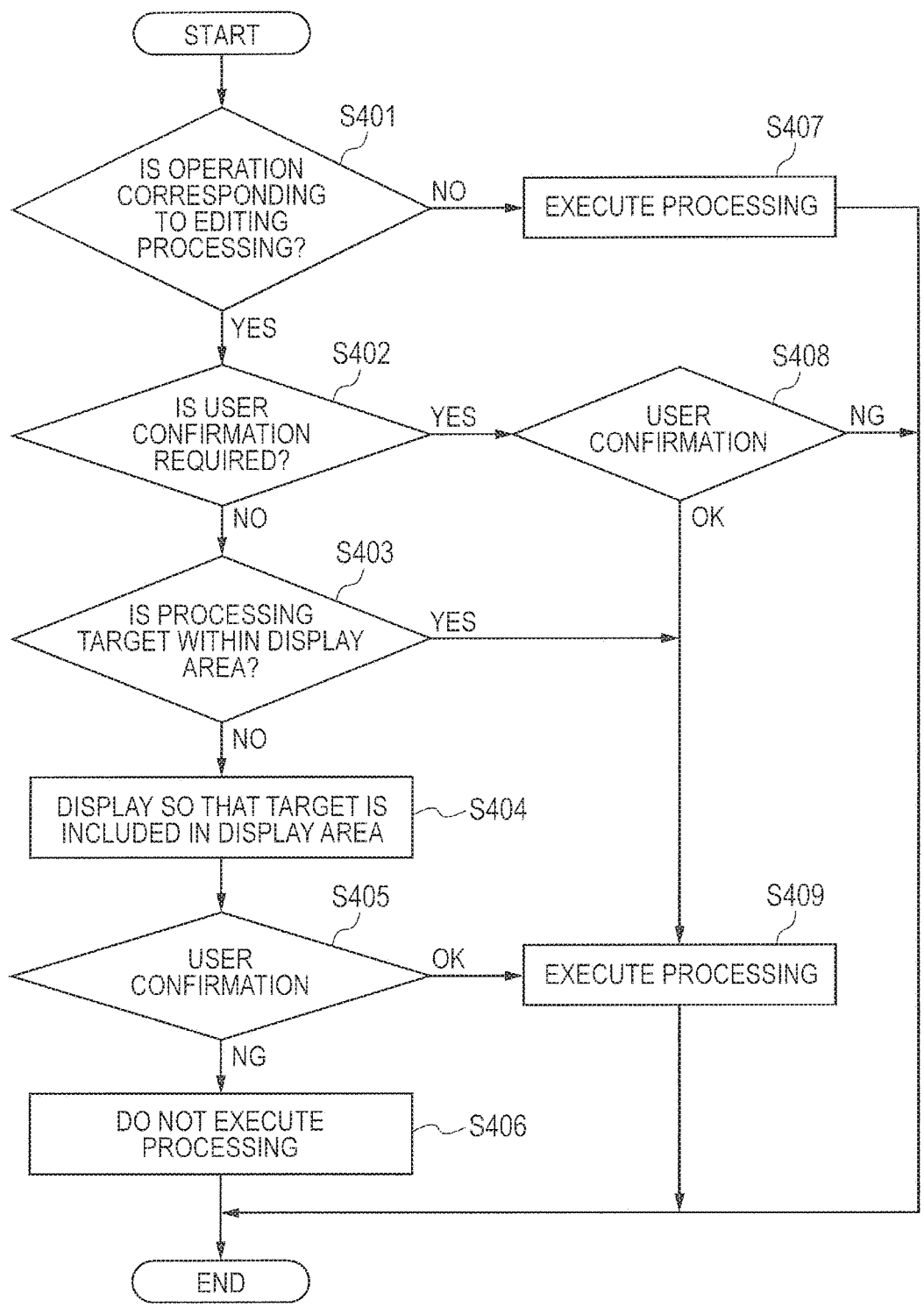
FIG. 4 is a flowchart of a control method of the information processing apparatus according to the first embodiment.

FIG. 4 is a flowchart of a control method of an information processing apparatus executed in accordance with the information processing apparatus of the present embodiment. The processing of this flowchart is included in an application program for editing a document, a photo book, and the like, and is executed in the information processing apparatus 100 by the CPU 106. Upon accepting the user operation by the touch panel 101a, keyboard 104, or pointing device 105, CPU 106 starts the processing of the flowchart. In step S401, the CPU 106 determines whether the type of the processing corresponding to the user operation is editing processing.

In FIG. 2A, when accepting the operation of the DELETE key, the CPU 106 determines that the corresponding processing corresponds to the editing processing because the processing is processing of deleting the character string "cat" indicated by the cursor 201. In FIG. 3A, when accepting the tap operation of the icon 303a, since the corresponding processing is the layout change processing of page 1, the CPU 106 determines that the corresponding processing corresponds to the editing processing. On the other hand, since processing such as the scroll display processing and the submenu display processing is merely processing for updating the display content and does not change the contents such as text and images, the CPU 106 determines that the processing is not editing processing. The CPU 106 may determine that the processing is not merely a display processing. Incidentally, the processing applied to the whole of the plurality of contents such as file saving processing is included in the editing processing.

When determining that the processing corresponding to the operation is not editing processing (No in step S401), the CPU 106 proceeds to step S407 and controls the processing so as to execute the processing corresponding to the accepted operation, and ends the processing of the flowchart. The CPU 106, for example, conducts scroll display of the text 203 in accordance with the operation of the scroll bar 202 in FIG. 2A. In FIG. 3A, the CPU 106 displays a submenu in accordance with the tap operation of the icon 303e.

When determining that the processing corresponding to the operation is editing processing (Yes in step S401), the CPU 106 proceeds to step S402, and determines whether the processing requires user confirmation. The user confirmation is to notify the user about the types of processing by using a message box or the like and to accept an instruction of the user regarding whether to execute the processing. User confirmation is usually required to execute processing that cannot be canceled when executed, and cannot be restored to the state before execution (for example, saving processing).

When determining that user confirmation is required (Yes in step S402), the CPU 106 proceeds to step S408, and confirms whether to execute the processing on the processing target with the user. The processing of step S408 is similar to the processing of step S405 to be described later.

When determining that user confirmation is not required (No in step S402), the CPU 106 proceeds to step S403, and determines whether the object of the processing target is within the display area or outside the display area, that is, whether the object is displayed in the display area. For example, in FIGS. 2A and 2B, the CPU 106 determines whether the cursor 201 is displayed on the text editing screen 200. In FIGS. 3A and 3B, the CPU 106 determines whether the selected page object 301a is displayed on the page editing screen 300.

When determining that the target of processing is within the display area (Yes in step S403), the CPU 106 proceeds to step S409 to execute processing on the object of the target. For example, in FIG. 2A, the CPU 106 determines that the cursor 201 is displayed on the text editing screen 200, and deletes the character string "cat" which is the processing target. In FIG. 3A, the CPU 106 determines that the selected page object 301a is displayed on the page editing screen 300, and changes the layout of the page object 301a which is the processing target.

Regarding determination whether the target is within the display area or outside the display area (step S403), even in the case where a part of the target is included in the display area, when the target more than a fixed ratio is not included in the display area, the CPU 106 may determine that the target is outside the display area. However, in the case of processing for the entire content such as a file saving processing, for example, it is determined that the processing target is within the display area regardless of the ratio of the inclusion in the display area.

When determining that the processing target is outside the display area (No in step S403), the CPU 106 performs processing control so as to suspend execution of processing corresponding to the accepted user operation with respect to the selected processing target. Then, the CPU 106 proceeds to step S404, and performs the display so that the target of the processing is included in the display area. For example, in FIG. 2B, the CPU 106 scrolls the text 203 downward to conduct display control so that the character string "cat" which is processing target is on the text editing screen 200 (FIG. 2C). In FIG. 3B, the CPU 106 scrolls the page objects 301c and 301d to the right to display the page object 301a which is the processing target on the page editing screen 300 (FIG. 3C). The position of the target within the display area is not limited. In FIG. 2C, the processing target is displayed on the first line of the text editing screen 200, but not limited to this, the target may be displayed on the middle line of the text editing screen 200.

In step S405, the CPU 106 confirms whether to execute processing on the processing target with the user. For example, the CPU 106 displays a message box including an "OK" button and an "NG" button on the display 101.

Upon receiving an instruction to execute processing (OK in step S405), for example, by operation of the "OK" button, the CPU 106 deletes the message box and proceeds to step S409. In step S409, the CPU 106 executes the processing on the processing target, and ends the processing of the flowchart. For example, in FIG. 2C, the CPU 106 deletes the character string "cat" located behind the cursor 201 (FIG. 2D). In FIG. 3C, the CPU 106 changes the layout of the selected page object 301a (FIG. 3D).

When receiving an instruction not to execute processing (NG in step S405), for example, by operation of the "NG" button, the CPU 106 deletes the message box, and proceeds to step S406. In step S406, the CPU 106 does not execute processing on the processing target, and ends the processing of the flowchart. For example, in FIG. 2B, the CPU 106 determines that the cursor 201 is not displayed on the text editing screen 200, and does not delete the character string "cat" which is the processing target. In FIG. 3B, the CPU 106 determines that the selected page object 301a is not displayed on the page editing screen 300, and does not change the layout of the page object 301a which is the processing target.

Either one of the processing of steps S404 and S405 may be omitted. When executing the processing of step S405, the CPU 106 does not have to execute the processing of displaying the processing target so as to be included in the display area (step S404). When not executing the processing of step S405, the CPU 106 may end the processing of the flowchart after executing the processing (step S404) of displaying the processing target so as to be included in the display area.

Further, in step S401, when there are a plurality of processing targets corresponding to the operation, the CPU 106 may proceed to step S407. For example, when both the page object 301a and the page object 301d are selected on the page editing screen 300, the CPU 106 determines that there are a plurality of processing targets.

According to the present embodiment, when the processing target corresponding to the user operation is outside the display area, execution of processing is suspended. As a result, in a state where the user cannot visually recognize the processing target, the processing is not immediately executed on the target. When the processing target corresponding to the user operation is outside the display area, it is confirmed whether the processing can be executed with the user before executing the processing. With this, in a state where the user cannot visually recognize the processing target, processing is not executed on the target without user's permission. Therefore, the processing can be prevented from being executed on the target without the user understanding the target and contents of the processing. Furthermore, when processing requiring user confirmation is executed, the user is asked whether to execute the processing, and the processing can be executed on the target according to the user's instruction regardless of whether the processing target is within the display area or outside the display area.

In conventional arts, even when the processing target is outside the display area, the processing is often executed according to user operation. In such a case, for example, it is difficult to grasp what kind of target has been deleted in accordance with the operation of the DELETE key and how the layout has been changed in accordance with the tap operation of the layout change icon, and the like. Furthermore, when a user accidentally performs erroneous operation, it is also difficult to understand what kind of processing has been executed. On the other hand, according to the present embodiment, when processing is executed according to the operation, the processing target is scrolled to be displayed within the display area, and it is confirmed whether to execute the processing with the user. Therefore, even when the processing target is outside the display area, the user can easily understand the target and contents of the processing.

Second Embodiment

Next, a control method of the information processing apparatus according to the second embodiment of the present invention will be described. In the control method according to the present embodiment, when the processing target is outside the display area, the target can be changed to another target. Hereinafter, differences from the first embodiment will be mainly described.

Figure 5:
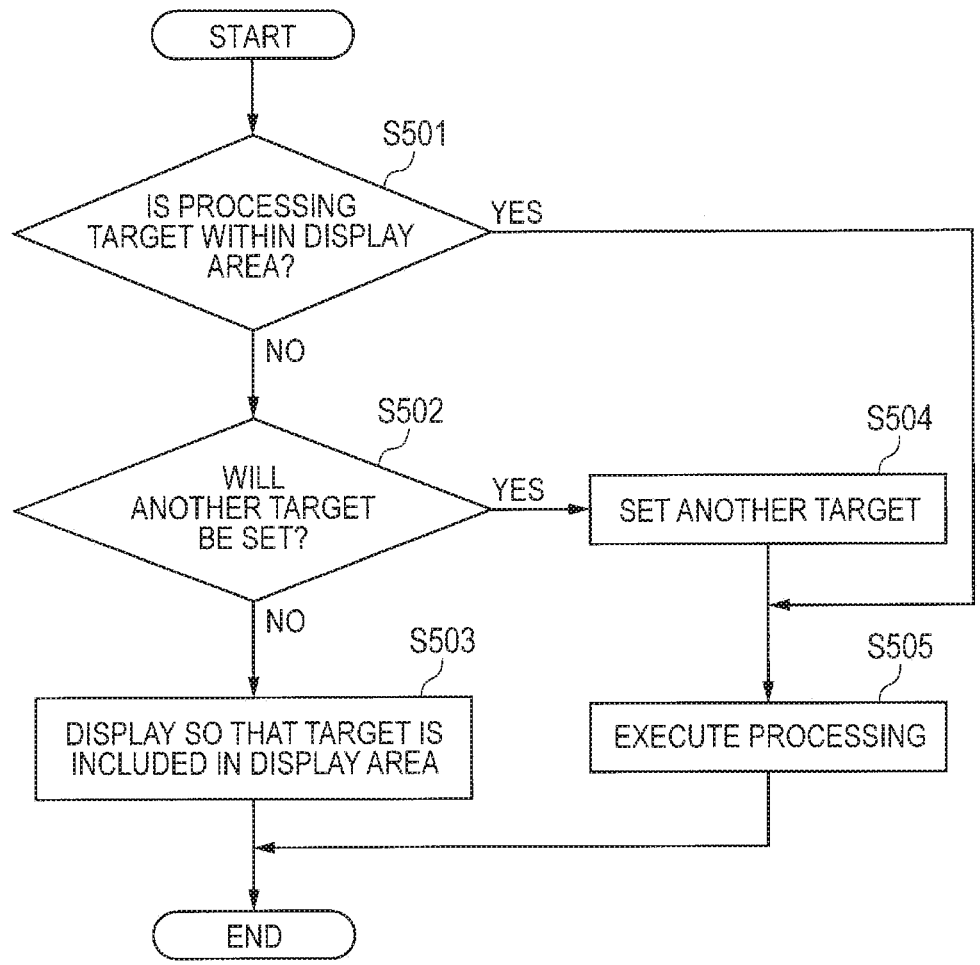
FIG. 5 is a flowchart of a control method of the information processing apparatus according to a second embodiment.

FIG. 5 is a flowchart of the control method of the information processing apparatus according to the present embodiment. The processing of this flowchart is included in an application program for editing a document, a photo book, and the like, and is executed in the information processing apparatus 100 by the CPU 106.

Upon accepting the user operation by the touch panel 101a, keyboard 104, and pointing device 105, the CPU 106 starts the processing of the flowchart. In step S501, the CPU 106 suspends execution of processing corresponding to the accepted operation, and determines whether the processing target is within the display area or outside the display area.

When determining that the processing target is within the display area (Yes in step S501), the CPU 106 proceeds to step S505 and performs processing control so as to execute the processing on the processing target. For example, in FIG. 2A, the CPU 106 determines that the cursor 201 is displayed on the text editing screen 200, and deletes the character string "cat" which is the processing target. In FIG. 3A, the CPU 106 determines that the selected page object 301a is displayed on the page editing screen 300, and changes the layout of the page object 301a which is the target of processing.

When determining that the processing target is out of the display area (No in step S501), the CPU 106 performs processing control so as to suspend execution of the processing corresponding to the accepted user operation with respect to the selected processing target, and proceeds to step S502. In step S502, the CPU 106 notifies the user that the processing target is out of the display area, and also confirms with the user whether to newly set the processing target. For example, the CPU 106 displays a message box including an "Yes" button and a "No" button on the text editing screen 200 or the page editing screen 300.

When receiving an instruction to newly set the processing target by operation of the "Yes" button (Yes in step S502), the CPU 106 deletes the message box, and proceeds to step S504. In step S504, the CPU 106 newly sets another target. For example, in FIG. 3B, the CPU 106 cancels the selected state of the currently selected page object 301a and newly designates another page object specified by the user's tap operation as a new target. Subsequently, in step S505, the CPU 106 executes processing on the target.

When receiving an instruction not to newly set the processing target (No in step S502), for example, by operation of the "No" button, the CPU 106 deletes the message box and proceeds to step S503. In step S503, the CPU 106 displays so that the processing target is included in the display area. For example, in FIG. 2B, the CPU 106 scrolls down the text 203 to display the character string "cat" which is the processing target on the text editing screen 200 (FIG. 2C). In FIG. 3B, the CPU 106 scrolls the page objects 301c and 301d to the right to display the page object 301a which is the processing target on the page editing screen 300 (FIG. 3C). After executing the processing of steps S503 and S505, the CPU 106 ends the processing of the flowchart.

In step S502, instead of confirming whether to newly set the processing target with the user, the CPU 106 may allow the user to choose whether to execute processing on the target outside the display area or to newly set a processing target.

According to the present embodiment, when the processing target is outside the display area, the processing target can be changed by newly setting a target. Due to this, processing can be prevented from being executed on targets outside the display area that the user does not intend. The user can designate an intended target and execute the processing without being conscious of the existence of the target that cannot be visually recognized.

Third Embodiment

Next, a control method of the information processing apparatus according to the third embodiment of the present invention will be described. The control method according to the present embodiment alternately displays the state of the target before processing and the state of the target after processing when the processing target is outside the display area. Hereinafter, differences from the first embodiment will be mainly described.

Figure 6:
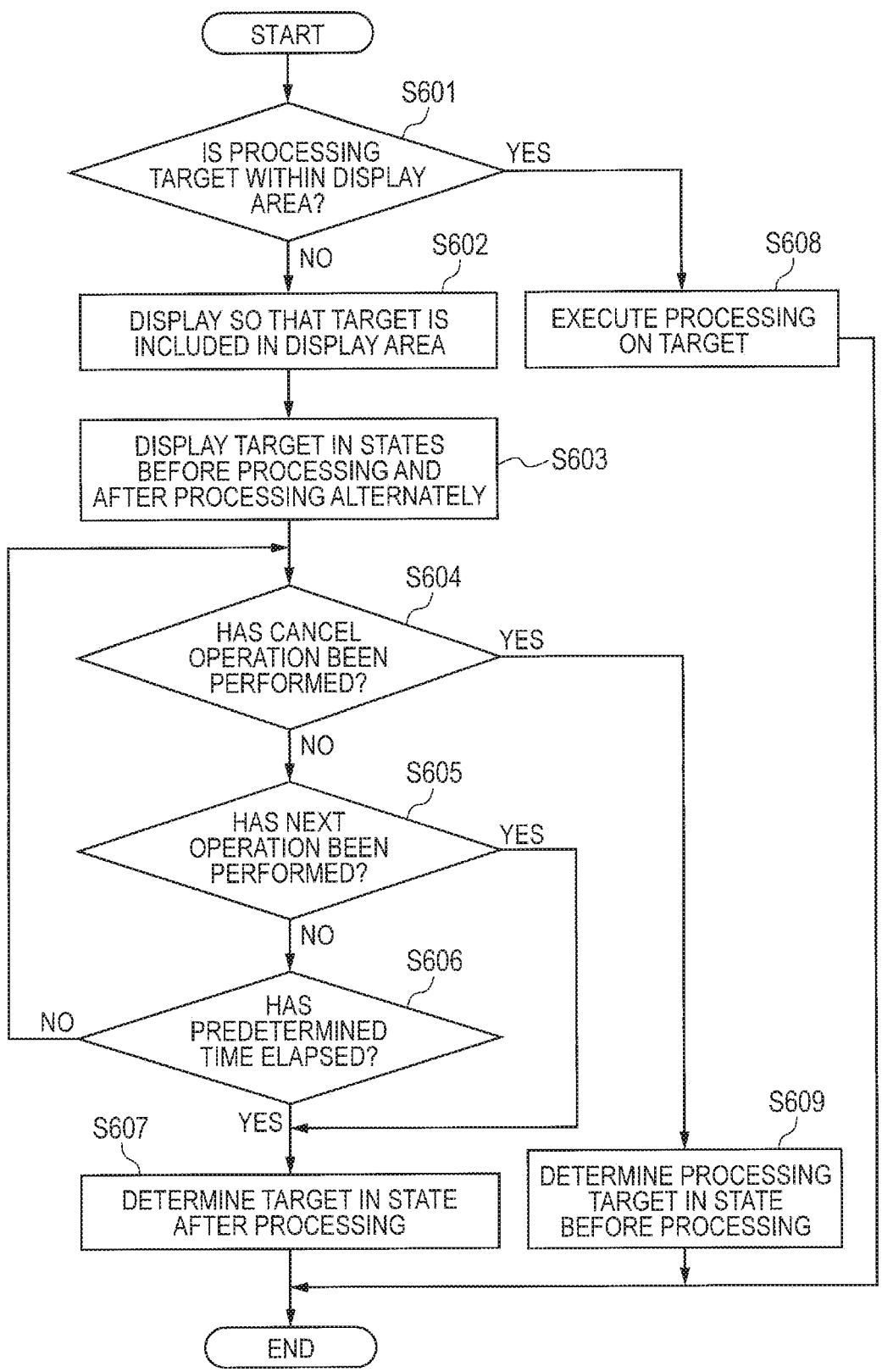
FIG. 6 is a flowchart of a control method of the information processing apparatus according to a third embodiment.

FIG. 6 is a flowchart of the control method of the information processing apparatus according to the present embodiment. The processing of this flowchart is included in an application program for editing a document, a photo book, and the like, and is executed in the information processing apparatus 100 by the CPU 106.

Upon accepting the user operation by the touch panel 101a, keyboard 104, and pointing device 105, the CPU 106 starts the processing of the flowchart. In step S601, the CPU 106 suspends execution of processing corresponding to the accepted user operation, and determines whether the processing target is within the display area or outside the display area.

When determining that the target of the processing is within the display area (Yes in step S601), the CPU 106 proceeds to step S608, and controls the processing so as to execute the processing on the target. For example, in FIG. 2A, the CPU 106 determines that the cursor 201 is displayed on the text editing screen 200, and deletes the character string "cat" which is the processing target. In FIG. 3B, the CPU 106 determines that the selected page object 301a is displayed on the page editing screen 300, and changes the layout of the page object 301a which is the target of processing.

When determining that the processing target is outside the display area (No in step S601), the CPU 106 performs processing control so as to suspend execution of processing corresponding to the accepted user operation with respect to the selected processing target. Then, proceeding to step S602, the CPU 106 displays so that the target of the processing is included in the display area. For example, in FIG. 2B, the CPU 106 scrolls down the text 203 to display the character string "cat" which is the processing target on the text editing screen 200 (FIG. 2C). In FIG. 3B, the CPU 106 scrolls the page objects 301c and 301d to the right to display the page object 301a which is the processing target on the page editing screen 300 (FIG. 3C).

In step S603, the CPU 106 alternately displays the processing target in the state before processing and the state after processing. For example, on the text editing screen 200, the CPU 106 display a state while switching between the state before processing in which the character string "cat" has not been deleted (FIG. 2C) and the state after processing in which the character string "cat" has been deleted (FIG. 2D). Further, on the page editing screen 300, the CPU 106 displays a state while switching between the state before processing in which the layout of the page 1 has not been changed (FIG. 3C) and the state after processing in which the layout of the page 1 has been changed (FIG. 3D). The CPU 106 performs such switching display on a predetermined cycle (for example, every one second).

In step S604, the CPU 106 determines whether the cancel operation of the switching display has been performed. For example, the CPU 106 determines whether operation of an escape key of the keyboard 104, tap operation on a cancel icon, or the like has been performed. When determining that the cancel operation has been performed (Yes in step S604), the CPU 106 terminates the switching display and proceeds to step S609. In step S609, the CPU 106 determines the target in the state before processing, that is, executes the processing on the target, and ends the processing of the flowchart.

When determining that the cancel operation has not been performed (No in step S604), the CPU 106 proceeds to step S605, and determines whether the next operation has been performed by the user. The next operation is normal operation other than the cancel operation described above.

When determining that the next operation has been performed (Yes in step S605), the CPU 106 terminates the switching display and proceeds to step S607. In step S607, the CPU 106 determines the target in the state after processing, that is, executes processing on the target, stores the processing result of the object of the target in the HDD 109, and ends the processing of the flowchart. When determining that the next operation has not been performed (No in step S605), the CPU 106 proceeds to step S606 and determines whether a predetermined time has elapsed from the start of switching display.

When determining that the predetermined time has not elapsed (No in step S606), the CPU 106 returns to step S604 and again executes the processing from step S604 to step S606. When determining that the predetermined time has elapsed (Yes in step S606), the CPU 106 terminates the switching display and proceeds to step S607. In step S607, the CPU 106 determines the target in the state after processing, that is, executes processing on the target, and ends the processing of the flowchart.

When determining that the next operation has been performed in step S605, the CPU 106 continues the processing corresponding to the next operation after ending the processing of the flowchart. Also for the next operation, the flowcharts of FIGS. 4 to 6 and the flowchart of FIG. 7 which will be described later can be applied.

According to the present embodiment, when the user operation is performed and the processing target is outside the display area, the state after processing and the state before processing of the target are alternately displayed for a predetermined period of time. With such switching display, the user can grasp the contents of the processing to be executed. When the user performs cancel operation within a predetermined period of time, the target is returned to the state before processing. On the other hand, when a predetermined period of time elapses without the user performing the cancel operation, the target is determined in the state after processing. Since the difference between the targets before and after processing becomes clear, the user can easily determine whether to execute the processing.

Fourth Embodiment

Next, a control method of the information processing apparatus according to the fourth embodiment of the present invention will be described. The control method according to the present embodiment changes the appearance of an icon when the user operates the icon when the processing target is outside the display area. Hereinafter, differences from the first embodiment will be mainly described.

Figure 7:
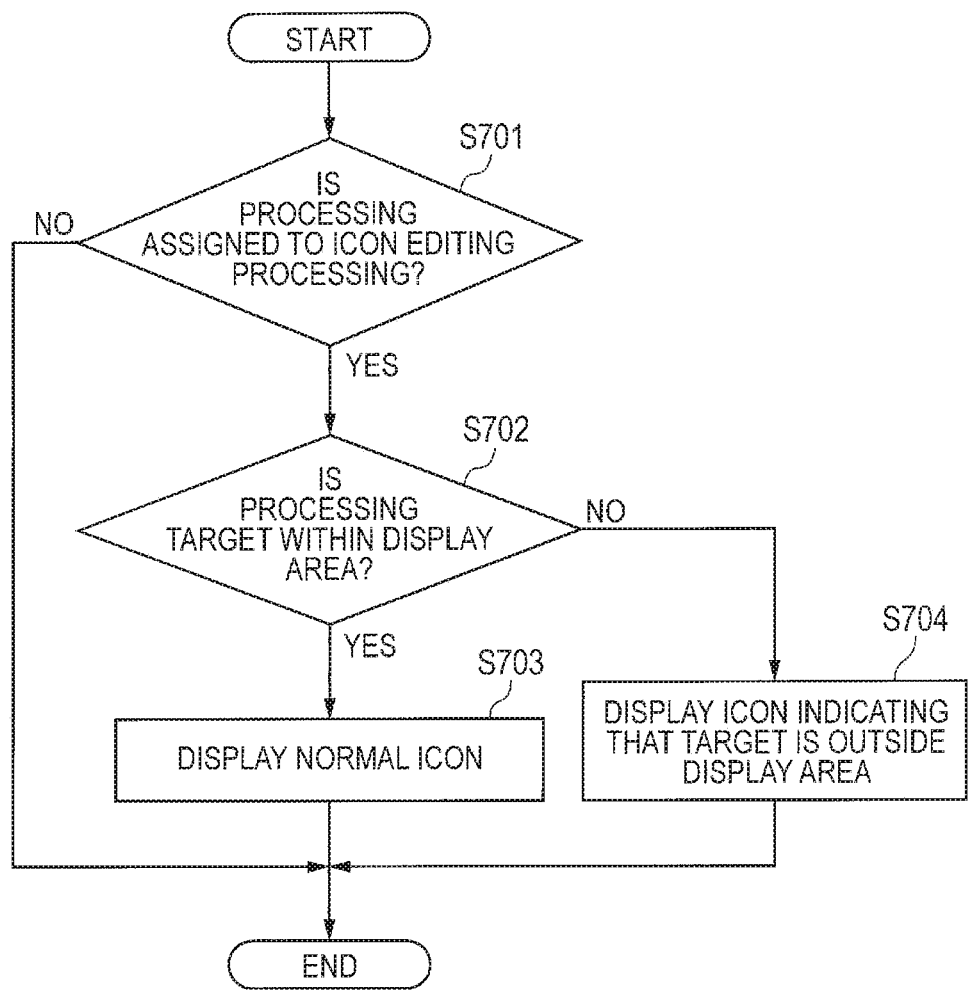
FIG. 7 is a flowchart of a control method of the information processing apparatus according to a fourth embodiment.

FIG. 7 is a flowchart of the control method of the information processing apparatus according to the present embodiment. The processing of this flowchart is included in an application program for editing a document, a photo book, and the like, and is executed in the information processing apparatus 100 by the CPU 106.

Upon accepting the user operation by the touch panel 101a, keyboard 104, and pointing device 105, the CPU 106 starts the processing of the flowchart. In step S701, the CPU 106 determines whether the processing assigned to the icon being displayed is editing processing of a content. For example, in FIG. 3A, the CPU 106 determines that the processing assigned to the icons 303a to 303d is editing processing of contents. On the other hand, the CPU 106 determines that the processing assigned to the arrow icon 302 and the icon 303e is not editing processing of contents.

When determining that the processing is not editing processing of a content (No in step S701), the CPU 106 ends the processing of the flowchart. When determining that the processing is editing processing of a content (Yes in step S701), the CPU 106 proceeds to step S702, and determines whether the processing target assigned to the icon is within the display area or outside the display area.

When determining that the processing target is within the display area (Yes in step S702), the CPU 106 proceeds to step S703 to display a normal icon. When determining that the processing target assigned to the icon is outside the display area (No in step S702), the CPU 106 proceeds to step S704 to display an icon indicating that the processing target is outside the display area. For example, the CPU 106 changes the shape or color of the icon, characters, symbols or pictures attached to the icon, or the like with respect to the icon whose processing target is determined to be outside the display area so that the icon can be distinguished from the normal icon. Further, the CPU 106 may temporarily invalidate the processing assigned to the icon and may alternatively assign processing of scroll-displaying so that the processing target is included in the display area.

In the present embodiment, the icons are used as an example but the present invention is not limited to this, and the flowchart of FIG. 7 may be applied to a GUI to which a predetermined processing is assigned such as a menu. The icon display in steps S703 and S704 can be performed at the same timing as the valid and invalid processing assigned to the icon.

According to the present embodiment, while the processing target assigned to the icon is outside the display area, the appearance of the icon keeps change to a state different from normal. Therefore, before operating on the icon, it is possible to know that the processing will be executed on the target outside the display area.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-167143, filed Aug. 29, 2016, which is hereby incorporated by reference herein in its entirety.

What is claimed is:

1. An information processing apparatus comprising:
a processor; and
a memory storing a program which, when executed by the processor, causes the information processing apparatus to:
control a display device so as to display a part of contents in a display area;
change the part of the contents which are displayed in the display area according to a first user operation for instructing to update the display area;
select an object from objects included in the displayed part of the contents;
determine whether the part of the contents including the selected object is displayed within the display area of a second user operation, different from the first user operation, is performed for instructing to execute a processing on the selected content;

execute the-processing on the selected object in response to the second user operation if it is determined that the part of the contents including the selected object is displayed within the display area;

suspend execution of the processing on the selected object in spite of the second user operation if it is determined that the part of the contents including the selected object is not displayed within the display area; and change the part of the contents which are displayed in the display area automatically such that the part of the contents including the selected object is displayed in the display area in response to the second user operation if it is determined that the part of the contents including the selected object is not displayed within the display area.

2. The information processing apparatus according to claim 1, wherein if it is determined that the part of the contents including the object is not displayed within the display area, the selected object in a state before execution of the processing and a state after execution of the processing are alternately displayed for a predetermined period of time, and the selected object in the state after execution of the processing is stored when cancel operation is not performed within the predetermined period of time.

3. The information processing apparatus according to claim 1, wherein if a plurality of objects are selected, or if a type of the processing is not editing processing, the processing is executed on the selected object in response to the second user operation without suspension even if it is determined that the part of the contents including the selected object is not displayed within the display area.

4. The information processing apparatus according to claim 1, wherein if it is determined that the part of the contents including the selected object is not displayed within the display area, information indicating that the selected object is not displayed in the display area is displayed in response to the second user operation.

5. The information processing apparatus according to claim 4, wherein the information includes an icon or a menu.

6. The information processing apparatus according to claim 1, wherein the processing is at least one of deletion processing and layout change processing.

7. The information processing apparatus according to claim 1, wherein the first user operation is a scroll operation.

8. The information processing apparatus according to claim 1, wherein the second user operation is an operation on the selected object.

9. The information processing apparatus according to claim 8, wherein the second user operation is performed for instructing to execute an editing processing on the selected object.

10. A method for an information processing apparatus comprising:

controlling a display device so as to display a part of contents in a display area;

changing the part of the contents which are displayed in the display area according to a first user operation for instructing to update the display area;

selecting an object from objects included in the displayed part of the contents;

determining whether the part of the contents including the selected object is displayed within the display area if a second user operation, different from the first user operation, is performed for instructing to execute a processing on the selected content;

executing the processing on the selected object in response to the second user operation if it is determined that the part of the contents including the selected object is displayed within the display area;

suspending execution of the processing on the selected object in spite of the second user operation if it is determined that the part of the contents including the selected object is not displayed within the display area; and changing the part of the contents which are displayed in the display area automatically such that the part of the contents including the selected object is displayed in the display area in response to the second user operation if it is determined that the part of the contents including the selected object is not displayed within the display area.

11. A non-transitory computer-readable recording medium including a program for causing an information processing apparatus to execute processing comprising:

controlling a display device so as to display a part of contents in a display area;

changing the part of the contents which are displayed in the display area according to a first user operation for instructing to update the display area;

selecting an object from objects included in the displayed part of the contents;

determining whether the part of the contents including the selected object is displayed within the display area if a second user operation, different from the first user operation, is performed for instructing to execute a processing on the selected content;

executing the processing on the selected object in response to the second user operation if it is determined that the part of the contents including the selected object is displayed within the display area;

suspending execution of the processing on the selected object in spite of the second user operation if it is determined that the part of the contents including the selected object is not displayed within the display area; and changing the part of the contents which are displayed in the display area automatically such that the part the contents including the selected object is displayed in the display area in response to the second user operation if it is determined that the part of the contents including the selected object is not displayed within the display area.

* * * * *